United States Patent [19]

Dalton

[11] Patent Number: 4,795,302
[45] Date of Patent: Jan. 3, 1989

[54] UNDERSLUNG TIRE CARRIER FOR VEHICLES
[76] Inventor: Thomas H. Dalton, Box 4482 Belfast Rd., Glen Allen, Va. 23060
[21] Appl. No.: 58,493
[22] Filed: Jun. 5, 1987
[51] Int. Cl.[4] .................................................. B62D 43/04
[52] U.S. Cl. .................................. 414/466; 224/42.23; 414/463; 414/917
[58] Field of Search ............... 224/42.08, 42.23, 42.28; 414/463, 466, 917

[56] References Cited
U.S. PATENT DOCUMENTS
3,187,914  6/1965  Péras .................................... 414/463
4,072,258  2/1978  Cruson ............................... 414/463 X Primary Examiner—Frank E. Werner
Assistant Examiner—Janice Krizek

[57] ABSTRACT

A tire carrier employs a parallelogram suspension and incorporates a simple screw-and-lever mechanism which is manually actuatable by a standard lug wrench to move between a securely held storage position and an easy-access position, whereby the tire carrier is swung out into its latter position from under the vehicle body, simultaneously releasing the tire from its secured storage position, to a convenient access position extending somewhat beyond the rear of the vehicle proximate and below the rear bumper.

17 Claims, 2 Drawing Sheets

UNDERSLUNG TIRE CARRIER FOR VEHICLES

This invention relates to an improved tire carrier and more particularly to a simplified tire carrier which is readily mounted in underslung location under the body of a variety of automotive vehicles such as trucks, pickup trucks and the like. The carrier is easily movable between a storage position and an easy-access position to offer convenient access for removal and replacement of tires.

BACKGROUND

Most motor vehicles are originally equipped with spare tire carriers or, alternately, such carriers can be added later. In order to keep cargo and passenger carrying capability as large as possible and to avoid obstruction of such, various spare tire carriers have been mounted on the outer sides of the body or in various underbody locations. The latter locations naturally result in the least objectionable arrangement from the point of view of utilization of cargo and passenger space, of access to doors, hatches, gates, and the like, and also for aesthetic reasons, as the tire in its carrier is essentially hidden from superficial view. Thus a variety of spare tire carriers have been mounted under vehicle bodies in spite of certain drawbacks, such as for instance, difficult accessibility and tire removal capability particularly when, as is usual, the carrier and tire are caked up with road dirt and when a tire has to be changed at night and in adverse weather.

It seems that industry's philosophy in regard to the construction of prior art carriers has been based on the idea that the purchaser and user of a vehicle is disinterested in the spare tire carrier type and location, as long as it does not obstruct cargo and passenger space, and as long as styling of the vehicle is not adversely affected. A tire change on the road is not too often needed nowadays and, in fact, only on such occasions are the inconveniences and disadvantages of conventional original equipment driven home—but then rather painfully. The actual utility of tire carriers seems to have been largely neglected by industry. Consequently, most original equipment tire carriers reflect this attitude, as a result of which commercially available tire carriers of the underbody type are highly inconvenient to use. Several tire carriers are known in the art with much improved utility, but these appear to be also of increased complexity and cost and are generally not commercially available. Needless to say, original motor vehicle equipment rarely, if ever, includes the latter type of carriers, presumably for reaons of their higher cost and complexity.

U.S. Pat. Nos. 3,904,093 to Hanela and 4,278,191 to Mecham, for example, disclose underbody-mounted spare tire carriers which appear to offer improved utility in that they have the capability to swing, tilt, or otherwise move out from under the vehicle body from their normal tire and carrier storage location, in order to facilitate convenient accessibility of tire removal and replacement. U.S. Pat. Nos. 3,187,914 to Peras and 3,330,431 to Knecht teach improvements to tire carriers providing similar capabilities.

U.S. Pat. Nos. 4,072,258 to Cruson and 4,573,855 to Braswell show tire carriers with convenient accessibility based on parallelogram suspension arrangements.

The above teachings offer desirable benefits, but the disclosed devices suffer from a relatively high complexity of mechanism and structure and thusly also from comparatively high cost.

It is, therefore, an object of the present invention to provide an improved spare tire carrier readily mounted in an underslung underbody location, but which is relatively simple in construction and low in manufacturing and installation cost. Nevertheless, the carrier of the invention provides for convenient access for removal and replacement of tires by being simply movable between a tire storage position and an easy-access position, while ensuring secure holding of a spare tire when in storage position.

SUMMARY

The present invention provides a spare tire carrier which employs a parallelogram suspension and incorporates a simple screw and lever mechanism which is manually actuatable by means of a standard lug wrench or the like to move between a securely held tire-and-carrier storage position and an easy-access position. As the tire carrier is swung out into its access position from under the vehicle body it simultaneously releases the tire from its secured storage position to a convenient access position extending somewhat beyond the rear of the vehicle proximate and below the rear bumper.

The spare tire carrier of the present invention comprises two substantially double-crank-shaped suspension members, pivotally suspended by end extensions within journal-like simple mounting brackets which are fastened to lateral chassis frame members of the vehicle. Mounting locations for these four brackets are disposed on respective lateral chassis frame members proximate the rear underside of the vehicle with the suspension member pivot axes oriented horizontally and at a right angle in relation to the longitudinal vehicle axis.

The rear suspension member is suspended close to the rear bumper and the front suspension member is suspended further forward by an appropriate distance of somewhat less than the outer diameter of the spare tire but not less than the diameter of the wheel rim. The horizontal width between the crank sides of each suspension member is somewhat more than the outer diameter of the spare tire, although it could be also somewhat less in the front suspension member. The depth or crank arm length of each suspension member is somewhat more than the axial thickness of the tire mounted on its rim. Both suspension members can exhibit substantially identical dimensions, except that each may be manufactured from different material stock sizes. The front suspension member, in addition to being double-crank shaped, has a cross-brace joining the two end extensions. Alternately, it may be manufactured such that a straight rod is symmetrically attached to the two ends of a U-shaped part, thusly forming a double-crank shape with the cross-brace. Both suspension members may be formed from round stock material by appropriate bending and welding or similar methods.

The front suspension member is further equipped with a short lever extension which may be, for instance, welded approximately near the center of or anywhere along the cross-brace in an orientation approximately directed opposite to the crank arm direction. Both suspension members may be manufactured, for instance, from round stock with the lever extension from flat stock material oriented in a vertical plane. When appropriately pivotally mounted on the vehicle's chassis frame, both suspension members are pivoted about parallel axes disposed in substantially the same horizontal plane and both crank arms extend substantially the same distance.

A link, for instance in the form of a length of channel iron (inverted U-section), pivotally joins the crank portions of the two suspension members and keeps their relative orientations at all times parallel. The length of this link between its pivot axes is substantially equal to the distance between the suspension member pivot axes, thusly forming a parallelogram in conjunction with the two crank arms. As heretofore described, this parallelogram-like arrangement is suspended in a freely movable pendulous manner below the chassis frame.

An actuation mechanism connects the lever extension of the front suspension member with the rear bumper, whereby contraction of this mechanism's length forces the parallelogram to contract in a forward and upward direction. The actuation mechanism comprises a connecting rod, for instance, employing at its forward end a clevis to engage the lever extension of the forward suspension member by means of a cross bolt secured thereon. A threaded rear end engages an internally threaded rod which is borne by a spherical bushing providing a bi-directional thrust bearing arrangement mounted on the rear bumper of the vehicle.

While permitting a relatively large amount of angular play, the spherical thrust bearing arrangement restrains the internally threaded rod from axial movement. This internally threaded rod extends through and beyond the bearing arrangement and is equipped with an appropriately-formed, short, nut-like extension to facilitate engagement by, for instance, a lug wrench for actuation of the tire carrier mechanism. Turning of the nut-like extension by means of a wrench rotates the internally threaded rod which thusly screws onto the threaded connecting rod and contracts or expands the mechanisms's length. This, in turn, forces the lever extension of the front suspension member forward or rearward. This action causes the parallelogram to contract or expand while its lower side (the link) moves forward and upward, or rearward and downward.

In use, the actuation mechanism is, for example, actuated to expand the parallelogram arrangement rearward and downward and, where needed, somewhat beyond the most downward position to a convenient easy-access position which extends the arrangement by a suitable amount beyond the rear bumper of the vehicle. A tire can then be conveniently placed within or removed from the region between the parallelogram arrangement where it can rest loosely on the link between the cranks. Subsequent actuation of the mechanism by means of the wrench in direction of a forward and upward contraction of the parallelogram arrangement moves the therein-contained tire forward and eventually upward into an appropriate underbody storage positon while securely tightening and holding the tire between its lower support, i.e., the link, and the cross-brace of the front suspension member. In the absence of a tire, the arrangement is simply moved further upward and forward out of the way. The mechanism, in its reliance on the screw engagement for actuation of the connecting rod, is, self-locking due to high frictional effects in the threads. The described procedure is reversed in order to remove a tire.

BRIEF DESCRIPTION OF THE DRAWINGS

For a better understanding of the invention, a particularly advantageous embodiment thereof will be described with reference to the accompanying drawings wherein the same reference numerals have been used to designate the same parts in the various views.

DESCRIPTION OF THE ILLUSTRATED EMBODIMENTS

Figure 1:
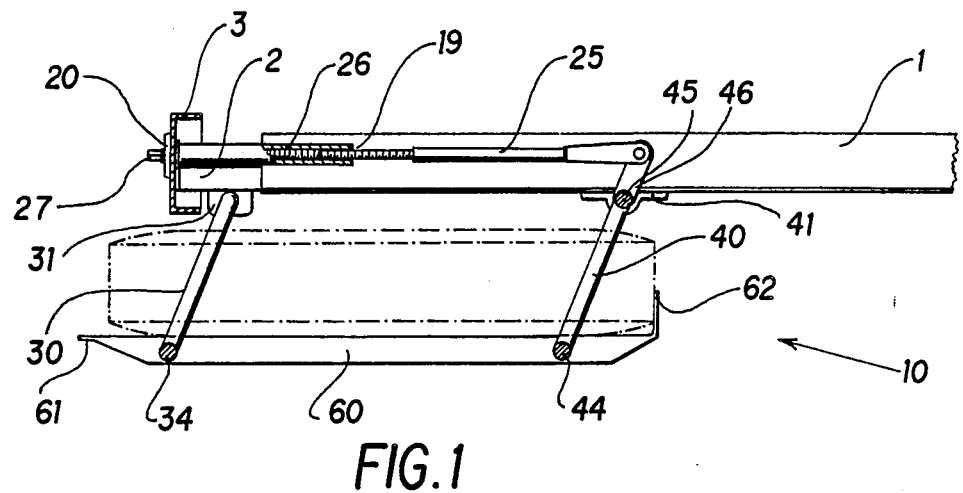
FIG. 1 is a schematic sectional side view of a tire carrier of the present invention, taken along the line 'A'—'A' of FIG. 3 and shown in easy-access position.
Figure 2:
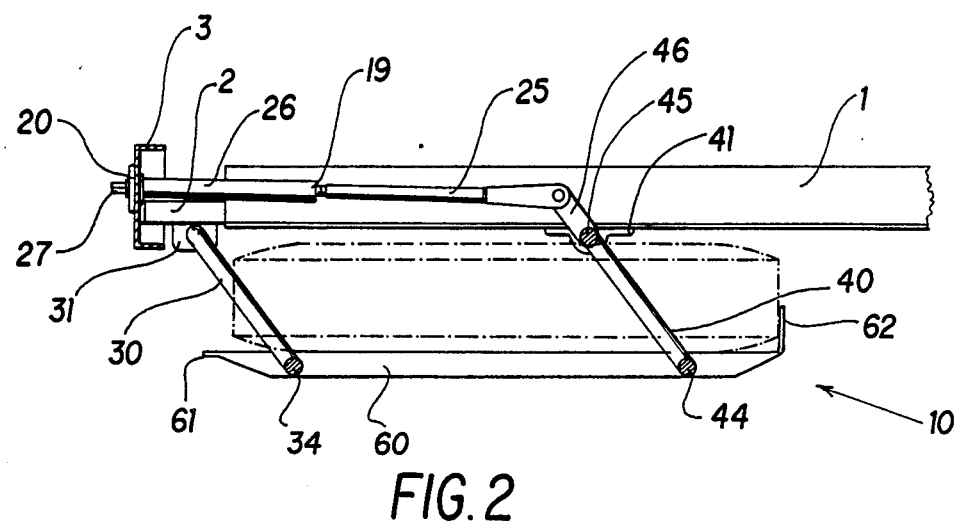
FIG. 2 is a schematic sectional side view similar to the view of FIG. 1, except that the tire carrier is shown in its storage position.
Figure 3:
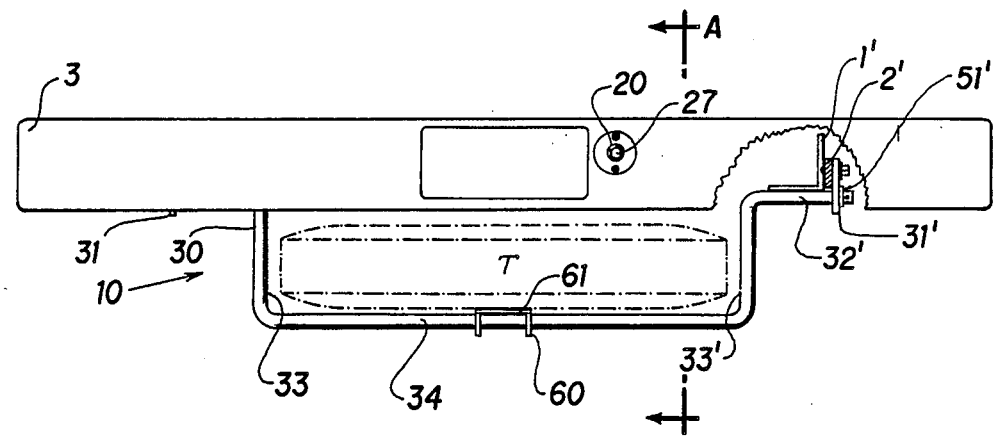
FIG. 3 is a schematic rear view of the tire carrier in easy-access position including a partial view past a cutaway portion of a rear bumper.

Referring now to the drawings, it will be seen that the tire carrier arrangement indicated at 10 in FIGS. 1, 2, 3 is suspendedly mounted on vehicle chassis frame members 1 and 1' and on vehicle rear bumper mounting arms 2 and 2' with a thrust bearing arrangement 20 being mounted in vehicle rear bumper 3. Bumper 3 employs two frontward-extending lateral mounting arms 2 and 2' in line with frame members 1 and 1' in a manner usually utilized in conventional motor vehicle construction.

The tire carrier arrangement 10 is suspended by double-crank-shaped suspension members, namely rear suspension member 30 and front suspension member 40. Front suspension member 40 is pivotally suspended by end extensions 42 and 42' by means of journal-like mounting brackets 41 and 41' which are affixed by conventional means, for instance bolts and locknuts, to the bottom surface of chassis frame members 1 and 1'. A common pivot axis is oriented horizontally and at a right angle in relation to the longitudinal vehicle axis. Any practical conventional means for axial retention of the suspension member 40 within its mounting brackets may be employed, such as for instance by means of the washer and cotter-pin arrangements 50 and 50' indicated in FIG. 4.

Rear suspension member 30 is pivotally suspended by end extensions such as 32' which include pivot portions on their outer regions as indicated in FIG. 3 by the shown end extension 32'-- the second end extension being hidden but being a symmetrically identical structure. The extensions such as 32' are mounted by means of mounting brackets such as 31', shown in FIGS. 1 to 3, which are affixed by conventional means, for instance lock-bolts, to the lateral surfaces of bumper mounting arms 2 and 2' respectively with the common pivot axis oriented horizontally and at a right angle in relation to the longitudinal vehicle axis. Various other suitable suspension and suspension bearing bracket arrangements may be employed to the same purpose. For instance, in vehicles where chassis frame members suitable for mounting of tire carriers extend all or most of the way to the rear bumper, four identical mounting brackets may be employed of either kind shown here or of any other appropriate kind. Again, any practical conventional means for axial retention of suspension member 30 within its mounting brackets may be employed, such as for instance by means of the washer and cotter-pin arrangement such as 51' (the opposite arrangement is not visible in FIG. 3, but should be visualized as symmetrically identical to 51').

Suspension members 30 and 40 may be made from round stock materials bent appropriately and welded, as indicated. However, other suitable material sections and other suitable manners of fabrication may be employed.

Rear suspension member 30 is suspended close to the rear vehicle bumper 3 and front suspension member 40 is suspended further forward on the vehicle frame by an appropriate distance of somewhat less than the outer diameter of the carried tire, but generally not less than the diameter of the wheel rim. The horizontal distance between the inner crank sides (crank-arm portions) 33, 33' and 43, 43' of the suspension members is somewhat more than the outer diameter of the tire. This distance, however, may be smaller between the crank sides 43 and 43' of the front suspension member 40.

A link 60, in form of a length of a suitable channel-section stock material, pivotally joins the crank portions 34 and 44 of suspension members 30 and 40 respectively and keeps their relative orientation substantially parallel during their movement. Thus, the distance between the horizontal pivot axes in link 60 substantially equals the distance between the pivot axes of the suspension mounting brackets 31 and 41 (and 31' and 41').

As can be seen, link 60 extends rearward some short distance beyond its pivotal engagement location with rear suspension member 30, gradually tapering toward its upper surface and forming a horizontal tongue 61, in order to facilitate tire insertion into and removal from the carrier in its easy-access position. A tire 'T', indicated by dash-dot lines, rests on top of link 60 with the carrier arrangement 10 in easy-access position in FIGS. 1 and 3 and in storage position in FIG. 2. As can be further seen, link 60, at its forward end, extends forward some short distance beyond its pivotal engagement location with front suspension member 40, gradually tapering toward its upper surface and forming a tongue which is bent substantially vertically upward to serve as a stop 62 to provide for a definite insertion stop when a tire is loaded into the carrier arrangement. Link 60 is preferably located substantially midway between the inner crank sides of suspension members 30 and 40 with its upper surface slightly raised above crank portions 34 and 44. In order to retain link 60 in its location on crank portions 34 and 44, conventionally common retention means (not shown) are employed, such as for instance given by washer and cotterpin arrangements mounted on each side of link 60 on crank-throw portions 34 and 44 during assembly and pinned or screw-fastened in place. Other suitable means may be employed.

Figure 4:
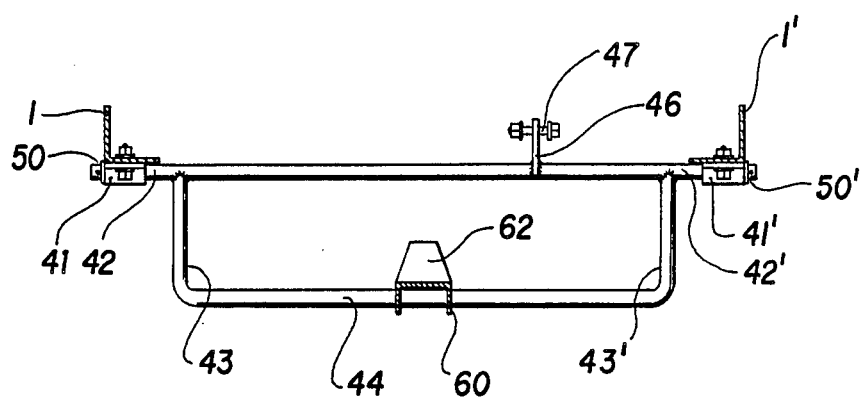
FIG. 4 is a schematic rear view of the front suspension portion of the tire carrier in easy-access position.

The vertical distance between the upper surface of link 60 and the lower edge of the rear bumper 3, when the tire carrier arrangement is in its easy-access position (FIGS. 1 and 3) allows ample clearance for tire removal and replacement. As shown, a somewhat larger distance is provided between the upper surface of link 60 and a cross-brace 45 of front suspension member 40 (FIGS. 1, 2 and 4). As easily seen from FIGS. 1 and 2, the described arrangement represents a parallelogram structure, whereby opposite sides between their pivot axes are of equal lengths and remain parallel during pivotal movement. However, it should be clear that strict adherence to a parallelogam structure is not required to provide the needed function. For instance, the length of the crank arm of the rear suspension member 30 may be somewhat longer than the length of the crank arm of the front suspension member 40, resulting in a rearward downtilt of link 60 as well as of tire 'T'. Under certain circumstances, such deviations from a parallelogram structure may be advantageous. Nonetheless, the general structure and functioning of the tire carrier arrangement 10 of the present invention is shown following substantially a parallelogram motion.

As particularly shown in FIG. 4, front suspension member 40 in its basic shape differs from rear suspension member 30 in that its double-crank form is modified by addition of the cross-brace 45, which may be a straight structural member joined, such as by welding, on one end to inner crank side 43 and on the other end to inner crank side 43'. Cross-brace 45 is in line with or in the vicinity of the pivot axis defined by the centerline of end extensions 42 and 42'. Alternately, cross-brace 45 may be arranged somewhat closer and still parallel to crank portion 44. The latter alternative may provide advantageous adaptation to arrangements wherein a tire carrier needs to be suspended on a vehicle frame high from the ground, for instance in high ground clearance vehicles, yet where convenient access to a spare tire may demand lowering of the tire closer to the ground. FIG. 4 shows a more general and preferred design for a majority of applications, whereby a cross-brace 45 is welded to a U-shaped member incorporating crank portion 44 as the bottom of the 'U', as indicated, and whereby the cross-brace is elongated at each end to have the required length to form end extensions 42 and 42'.

Front suspension member 40 is further equipped with a short lever extension 46 which is appropriately affixed, such as by welding, onto the cross-brace 45 in a location anywhere along the length of cross-brace 45 depending on the desired lateral location of tire carrier actuation mechanism 19. Lever extension 46 is arranged in an orientation approximately opposite to the direction of the crank arms of front suspension member 40 in relation to the pivot axis of end extensions 42 and 42'. Lever extension 46 may, however, be arranged in other orientations deviating from being directly opposite to the crank arms of front suspension member 40. Particularly it may have an angle of less than 180 degrees on its front-facing side in order to provide a large actuation-movement range within the given constraints dictated by particular vehicle structures. It can be visualized, for example, that the lever extension 46 may also be advantageously formed as a pie-shaped circular segment having two or more holes for alternate pivotal engagement locations of actuation mechanism 19 for adaptation of the tire carrier arrangement to various vehicle sizes and different tire sizes.

As can be seen from FIG. 4 in conjunction with FIGS. 1 and 2, lever extension 46 may be made from flatstock material oriented in a vertical longitudinal plane. The upper end of lever extension 46 is provided with a cross hole to serve for pivotal engagement of the forward end of actuation mechanism 19 by means of, for example, a cross-bolt and lock-nut arrangement 47 indicated in FIG. 4, although other conventional pivotal mounting arrangements may be used.

When the heretofore described tire carrier arrangement 10 is appropriately pivotally mounted on the underside of a vehicle's chassis frame, both suspension members 30 and 40 pivot about parallel axes disposed in substantially the same horizontal plane and both crank arms extend substantially the same distance from their pivot axes.

As indicated in the drawings, suspension members 30 and 40 may be manufactured from round section material, for instance steel rod, appropriately bent and welded to the required shape.

The actuation mechanism 19, shown in FIGS. 1 and 2, extends between a pivotal engagement, through lever extension 46, with cross-brace 45 of suspension member 40 and a thrust bearing arrangement 20 mounted within the vehicle's rear bumper 3.

Actuation mechanism 19 comprises at its forward end a clevis-ended connecting rod 25 whose rear end is provided with male screw threads for engagement with female threads within the front end of an actuator rod 26. While the engagement between connecting rod 25 and lever extension 46 (by means of cross-bolt and locknut arrangement 47) is shown by means of a clevis, other appropriate conventional means may be utilized.

Actuator rod 26, at its rear end, is provided with an appropriately necked-down diameter to fit within and through thrust bearing 20, providing a short projection beyond the rear face of bearing 20. A hexagonal, lug-nut-shaped ferrule 27 is rigidly affixed over said short projection at the rear end of actuator rod 26 beyond the rear face of bearing 20. Ferrule 27 is preferably of a size and shape identical to the lug nuts of the vehicle's wheels in order to permit use of the vehicle's lug wrench for engagement with it, for turning of it, and thusly for actuation of the tire carrier actuation mechanism 19. Ferrule 27, in its fastening to the rear projection of actuator rod 26 serves in conjunction with the shoulder of the necked-down rear portion of actuator rod 26 to restrain the actuator rod from axial movement within thrust bearing 20.

Thrust bearing 20 is of a type permitting angular misalignment as well a withstanding bi-directional thrust, such as for instance given by conventional spherical-bushing bearings for bi-directional thrust. Alternately, thrust bearing 20 may comprise an arrangement of matched pairs of conventional spherical washers disposed on either side of a clearance hole in bumper 3 and retained in such position by the aforesaid axial movement restraint of the shoulder of actuator rod 26 and ferrule 27. Other conventionally-known thrust bearing arrangements allowing angular misalignment may also be used.

Turning of the ferrule 27 and therewith of the actuator rod 26 by means of a suitable wrench, for instance the vehicle's lug wrench, causes exertion of an axial motion and force in a direction depending on the direction of rotation and the handedness of the screw threads engaging the connecting rod 25. The axial motion and force is converted to a torque exerted onto front suspension member 40 about its pivotal axis, e.g. about its end extensions 42 and 42', by means of the engagement of the clevis of connecting rod 25 with lever extension 46. That torque is also transmitted from suspension member 40 to suspension member 30 via link 60. Thus the turning of ferrule 27 results in appropriate movement of the entire arrangement in a parallelogam manner, as described above.

In use, ferrule 27 of actuation mechanism 19 is turned by means of an appropriate wrench until the tire carrier swings down and rearward, particularly until tongue 61 of link 60 protrudes somewhat rearward from under the rear bumper 3, as indicated in FIG. 1. A tire 'T' may then be conveniently placed onto link 60 (or a tire, if already present, may be removed rearwardly) and pushed forward until it is stopped by stop 62. Ferrule 27 is then turned in the opposite direction of rotation, which causes the arrangement carrying the tire to move forward and eventually also upward into a position shown in FIG. 2. At this point, the upper surface of tire 'T' contacts cross-brace 45 of suspension member 40 (FIG. 4), as can be envisaged from the relationship of components shown in FIG. 2. Further tightening of ferrule 27 squeezes and clamps tire 'T' between cross-brace 45 and the tire's resting surface, namely the upper face of link 60 and will thusly securely hold the tire in its storage position. When the need arises for removal of tire 'T', the described actuation procedure is reversed until the easy-access position shown in FIG. 1 is obtained and the tire may be conveniently removed. In the absence of a tire to be carried, the entire arrangement of tire carrier 10 may be actuated beyond the point described above for storing of a tire, such that the movable component structure is lifted forward and upward even further until a stop (not shown) is reached or until the limit of travel for the arrangement is obtained. Friction effects, particularly within the screw thread engagement of the actuation mechanism 19 result in secure holding of the carrier arrangement in any position and especially in its storage position when the arrangement is preloaded against the elastic reaction of the clamped and squeezed tire 'T'. Thus only action of the mechanism 19 by means of ferrule 27 will allow release and removal of a stored tire.

The various components of the tire carrier disclosed herein can be made of steel, aluminum or other appropriate materials.

While the invention has been particularly shown and described with reference to preferred embodiments thereof, it will be understood by those skilled in the art that various changes and modifications in form and details may be made therein without departing from the spirit and scope of the invention. The clevis on rod 25, for example, can be changed to a simple 90° bend in the end of the rod so that the bent end extends through a mating hole in the lever 46.

The embodiments of the invention in which an exclusive property or privilege are claimed are defined as follows:

1. A tire carrier for mounting below a vehicle chassis and comprising:
   first and second double-crank-shaped suspension members, each of unitary structure and spaced from each other such that said second double-crank-shaped suspension member is located farther from the front of said vehicle than said first double-crank-shaped suspension member, each having crank-arm portions, an elongated crank-throw portion, and pivot portions;
   pivot means for pivotally suspending [the]said pivot portions of said first and second double-crank-shaped suspension members about an axis so that said crank-arm portions extend below the chassis of said vehicle;
   link means for connecting said elongated crank-throw portions of said first and second double-crank-shaped suspension members and adapted to have said tire selectively carried thereabove;
   lever means rigidly fastened to said first double-crank-shaped suspension member in a location disposed between said pivot portions and with an angular orientation of the length thereof that is generally opposite to the extent of said crank-arm portion with respect to said axis of said pivot portions of said first double-crank-shaped suspension member so that arcuate motion of said lever means causes said first and second double-crank-shaped suspension members to pivot about said pivot means;

actuating means connected to said lever means and extending therefrom generally in a direction toward the rear of said vehicle, said actuating means being comprised of a rotary portion and a linear portion and operative to convert rotary motion of said rotary portion to linear motion of said linear portion so that said rotary motion of said rotary portion causes said arcuate motion of said lever means which, in turn, causes said first and second double-crank-shaped suspension members and thereby a tire mounted thereon to selectively undergo joint horizontal and vertical motion.

2. The tire carrier of claim 1 including a cross brace rigidly fastened to and extending laterally between said pivot portions and substantially parallel to said crank-throw portion of said first double-crank-shaped suspension member and wherein said lever means is affixed to said cross brace.

3. The tire carrier of claim 2 wherein said tire is clamped, when in a storage position, between said cross brace and said link means.

4. The tire carrier of claim 1 wherein said link means includes a stop member for limiting motion of said tire relative to said carrier.

5. The tire carrier of claim 1 wherein said pivot means includes first and second pivot assemblies associated respectively with said first and second double-crank-shaped suspension members, said first pivot assembly being connected to chassis frame members of said vehicle and said second pivot assembly being connected to bumper mounting arms on said vehicle.

6. The tire carrier of claim 1 wherein said actuating means includes a rotatable threaded actuator member and a connecting member threadably engaged at one end with said rotatable actuator member and at its other end with said lever means so that rotation of said actuator member causes linear motion of said connecting member.

7. The tire carrier of claim 6 including a thrust bearing located and retained in a horizontally extending guard for protecting the rear of said vehicle, said actuator member rotatably passing through said thrust bearing; and, means for preventing linear motion of said actuator member relative to said thrust bearing.

8. The tire carrier of claim 7 wherein said thrust bearing is of the spherical-bushing type.

9. The tire carrier of claim 7 including a ferrule affixed to one end of said actuator member for accommodating a tool for rotating said actuator member.

10. The tire carrier of claim 9 wherein said ferrule is shaped to accommodate a lug wrench.

11. The tire carrier of claim 10 wherein said ferrule is shaped to accommodate a lug wrench of a size corresponding to the lug nuts on the wheels of said vehicle.

12. The tire carrier of claim 6 wherein said connecting member is connected to said lever by means of a clevis joint.

13. The tire carrier of claim 6 wherein said actuating means is held in a storage position by means of friction of the threaded engagement between said actuator member and said connecting member.

14. The tire carrier of claim 1 wherein said double crank-shaped suspension members include end extensions having said pivot portions thereon and mounting brackets are affixed to said vehicle so that said pivot portions of said end extensions are journalled in said mounting brackets.

15. The tire carrier of claim 1 wherein the extent of said crank-arm portions are greater than the axial thickness of said tire.

16. The tire carrier of claim 1 wherein said link means includes a tongue extending outwardly from one end thereof for facilitating insertion of a tire thereon.

17. The tire carrier of claim 1 wherein the maximum distance between said link means and a horizontally extending guard for protecting the rear of said vehicle is greater than the axial thickness of said tire.

* * * * *